United States Patent [19]

Dunski et al.

[11] Patent Number: 4,775,710
[45] Date of Patent: Oct. 4, 1988

[54] STABILIZED LINEAR LOW-DENSITY POLYETHYLENE CONTAINING RING-SUBSTITUTED N-ACYL-PARA-AMINOPHENOL

[75] Inventors: Neil Dunski, Creve Coeur; Henry J. Buehler, St. Louis, both of Mo.

[73] Assignee: Mallinckrodt, Inc., St. Louis, Mo.

[21] Appl. No.: 5,549

[22] Filed: Jan. 21, 1987

Related U.S. Application Data

[63] Continuation of Ser. No. 808,203, Dec. 12, 1985, abandoned.

[51] Int. Cl.$^4$ .............................. C08K 5/52; C08K 5/20
[52] U.S. Cl. ...................................... 524/222; 524/120
[58] Field of Search ....................... 524/222, 224, 120

[56] References Cited

U.S. PATENT DOCUMENTS

| Re. 26,158 | 2/1967 | Tholstrup | 524/222 |
|---|---|---|---|
| 2,418,270 | 4/1947 | Matuszak | 252/251 |
| 3,184,522 | 5/1965 | Zagar | 524/222 |
| 3,285,855 | 11/1966 | Dexter et al. | 524/291 |
| 3,903,029 | 9/1975 | Young | 524/222 |
| 3,922,322 | 11/1975 | Dormenval et al. | 260/878 B |
| 3,965,083 | 6/1976 | Jezl et al. | 526/65 |
| 3,971,768 | 7/1976 | Peters et al. | 526/68 |
| 4,003,712 | 1/1977 | Miller | 23/288 S |
| 4,011,382 | 3/1977 | Levine et al. | 526/96 |
| 4,129,701 | 12/1978 | Jezl et al. | 526/65 |
| 4,302,565 | 11/1981 | Goeke et al. | 526/88 |
| 4,302,566 | 11/1981 | Karol et al. | 526/125 |

FOREIGN PATENT DOCUMENTS

| 40-13263 | 6/1965 | Japan. |
| 6505775 | 11/1965 | Netherlands. |
| 1083502 | 9/1967 | United Kingdom. |

OTHER PUBLICATIONS

Sahar Al-Malaika et al.–*Degradation and Stabilization of Polyolefins*–pp. 247–265, 280 and 281 (1983).
George Scarry et al.: Plastics Engineering, Dec. 1982, pp. 37–41.
Kirk–Othmer Encyc. of Chem. Technology, 3rd edition, vol. 16, pp. 385–401 (1981).
Kirk–Othmer Encyc. of Chem. Technology, 3rd edition, vol. 3, pp. 128–148 (1978).
"Linear Low-Density Polyethylene G–Resin 7047 Natural 7", Tech. Bull., PP 72–13 B, Union Carbide Corp., (3 pages).

*Primary Examiner*—Veronica P. Hoke
*Attorney, Agent, or Firm*—R. J. Klostermann; L. N. Goodwin; Veo Peoples

[57] ABSTRACT

Disclosed are stabilized linear low-density polyethylene (LLDPE) compositions containing a stabilizing amount of a ring-substituted N-acyl-para-aminophenol. In a preferred embodiment, the latter compound is N-stearoyl-2,6-di-t-butyl-4-aminophenol.

17 Claims, No Drawings

STABILIZED LINEAR LOW-DENSITY POLYETHYLENE CONTAINING RING-SUBSTITUTED N-ACYL-PARA-AMINOPHENOL

This is a continuation of application Ser. No. 808,203, filed Dec. 12, 1985, now abandoned.

The present invention relates to a polymeric composition comprising linear low-density polyethylene and a stabilizing amount of a ring-substituted N-acyl-paraaminophenol.

As used herein, the term "linear low-density polyethylene" (sometimes referred to herein as "LLDPE") means a copolymer of a major mol percent of ethylene with a minor mol percent of one or more alpha olefins having from 3 to about 8 or more carbon atoms, the copolymer being prepared by low pressure polymerization and having a density of 0.94 grams per cubic centimeter (g/cc) or less.

The American Society for Testing Materials has devised a classification of polyethylenes by density, which includes Type I ("low density" having a density of 0.910–0.925 g/cc), Type II ("low density" having a density of 0.926–0.940 g/cc), Type III ("high density copolymer" having a density of 0.941–0.959 g/cc) and Type IV ("high density homopolymer" having a density of at least 0.96 g/cc). See ASTM D 1248-78, Part 36, American Society for Testing Materials, Philadelphia, Pa., 1979, p. 90.

A number of the many varieties of polyethylenes (including LLDPE) are discussed in *Kirk-Othmer, Encyclopedia of Chemical Technology*, 3rd edition, vol. 16 (1981) under the heading "OLEFIN POLYMERS" beginning on page 385. As pointed out on page 386 thereof the above ASTM classification does not distinguish between high pressure and low pressure low density polyethylenes, and accordingly "the term linear low density polyethylene (LLDPE) is frequently used for low pressure polyethylenes."

In a section entitled "Processing" under the subheading "LOW PRESSURE LINEAR (LOW DENSITY) POLYETHYLENE," the above-cited Kirk-Othmer text states: "Various antioxidants, stabilizers, and additives are added to prevent oxidation, discoloration, and thermal degradation during melt processing." at page 394. The text continues:

"A general-purpose resin suitable for noncritical short-term applications may contain 0.01–0.02 wt % [1] 2,6-tert-butyl-4-methylphenol (BHT) as the sole antioxidant. Resins for longer-term applications or high heat requirements generally contain a less volatile additive, for example, [2] octadecyl 3-(3,5-di-tert-butyl-4-hydroxyphenyl)propionate, [3] pentaerythrityl tetrakis[3-(3,5-di-tert-butyl-4-hydroxyphenyl)propionate], or [4] a combination of BHT with a synergist such as dilauryl 3,3′-thiobispropionate." at page 395.

However, compounds 1, 2 and 3 above have not been entirely satisfactory for preventing or minimizing oxidation, discoloration and thermal degradation of LLDPE, especially during melt processing thereof. Accordingly, there is a substantial need in the art for stabilized LLDPE compositions having improved stability or resistance to degradation such as oxidation, discoloration and thermal degradation, especially during melt processing thereof.

The present invention substantially fulfills the above need by stabilizing linear low-density polyethylene against discoloration and oxidative and thermal degradation with a stabilizing amount of a ring-substituted N-acyl-para-aminophenol, for example, N-stearoyl-2,6-di-t-butyl-4-aminophenol. The latter compound is sometimes referred to herein as "di-t-Bu-SPAP" and sometimes simply as "DTB-SPAP".

Japanese patent No. Sho 40 [1965]-13263 discloses polyolefin compositions stabilized with respect to high temperatures by mixing polyolefins with N-substituted-2,6-dialkyl-4-aminophenol compounds. N-stearoyl-2,6-di-t-butyl-4-aminophenol is mentioned therein among "typical examples" of the compounds (translation pages 3–5). The term "polyolefins" is defined in the Japanese patent as "polymers or copolymers of ethylene, propylene, butene, pentene, styrene, etc. or copolymers of these monomers with other components that contain these monomers as the primary ingredients" (translation page 8). However, there is no disclosure therein of linear low-density polyethylene stabilized with DTB-SPAP or other substituted aminophenols.

British Pat. No. 1,083,502 relates to the "stabilization of high polymers especially nylon, polypropylene and polyethylene against degradation by exposure to heat" by "addition thereto of at least one stabilizer compound" exemplified by N-stearoyl-amino-2,6-di-tert-butylphenol (pages 1—2). The patent states "Particularly in the case of polyolefine polymers, mixtures of the phenols [the stabilizer compounds] . . . with . . . dilaurylthiodipropionate may be used to obtain an enhanced stabilizing effect." Example 8 describes addition of N-stearoyl-amino-2,6-di-tert-butylphenol alone (0.5%), and together with dilaurylthiodipropionate (0.25% each), to polypropylene powder.

Published Dutch Patent Application No. 6505775 discloses "rubber mixtures" containing 2,6-di-tert-butyl-4-N-stearoylaminophenol and 6-tert-butyl-3-methyl-4-N-stearoylaminophenol (Example V, pages 8–9).

The present invention could not be predicted, notwithstanding the disclosures in the above-cited Japanese patent, British patent and published Dutch patent application. As recognized in the art, whether or not a compound will be effective as an antioxidant in a given homopolymer or copolymer can not be predicted from the effectiveness of such compound as an antioxidant in another homopolymer or copolymer. Such lack of predictability applies even where both polymers are polyethylenes. Antioxidant requirements of plastics vary widely, dependent upon the application. Many types of polyethylene respond differently to various antioxidants. In general, in order to evaluate an antioxidant composition (i.e., to determine whether or not a known antioxidant composition will be effective in a given substrate), the composition must be tested in the substrate. See Kirk-Othmer, Encyclopedia of Chemical Technology, 3rd edition, vol. 3 (1978), pages 128–142 ("ANTIOXIDANTS"), especially page 137 (relating to stabilization of plastics by antioxidants) and pages 141–142 (relating to evaluation of antioxidants in elastomers, plastics and petroleum products).

DESCRIPTION OF THE INVENTION

Generally stated, the present invention provides a stabilized copolymer-containing composition comprising:

(A) linear low-density polyethylene as the copolymer; and (B) a stabilizing amount of a ring-substituted N-(aliphatic acyl)-para-aminophenol containing at least one substituent $R_1$ in the ortho position relative to the hydroxyl group of the phenol moiety, wherein the aliphatic acyl group contains from about 2 to about 22 carbon atoms and $R_1$ is an acyclic or cyclic alkyl group, which may be, for example, an acyclic alkyl group containing from 1 to about 8 carbon atoms or a cycloalkyl group containing from 5 to about 12 carbon atoms.

DETAILED DESCRIPTION OF THE INVENTION AND OF THE MANNER AND PROCESS OF MAKING AND USING IT

LLDPE copolymers which can be employed as the LLDPE copolymer component of the composition of the present invention are well-known in the art and can be prepared, for example, by the low pressure gas-phase polymerization processes disclosed in U.S. Pat. Nos. 4,003,712 (Miller), 4,011,382 (Levine et al.), 4,302,565 (Goeke et al.) and 4,302,566 (Karol et al.) to Union Carbide Corporation; 3,922,322 (Dormenval et al.) to Naphtachimie; and 3,965,083 (Jezl et al.), 3,971,768 (Peters et al.) and 4,129,701 (Jezl et al.) to Standard Oil Company. The LLDPE copolymer component may also suitably be prepared by low pressure liquid-phase (slurry or solution) polymerization processes, including for example the commercial liquid-phase LLDPE-polymerization processes developed by Phillips Petroleum Company, DuPont of Canada, Dow Chemical Company and others. A liquid-phase process is disclosed in U.S. Pat. No. 2,418,270 (Matuzak) to Phillips Petroleum Company.

The LLDPE copolymer component is an LLDPE copolymer of a major mol percent (e.g. at least 85%, preferably at least 90%) of ethylene and a minor mol percent (e.g. 15% or less, preferably 10% or less) of one or more alpha-olefins having from 3 to about 8 carbon atoms. The alpha olefin comonomers are preferably alpha-mono-olefins and include, for example, propylene, 1-butene, 1-pentene, 1-hexene, 1-pentene, 1-octene and 4-methyl-1-pentene. Preferred alpha-olefin comonomers are linear alpha-olefins, i.e. alpha-olefins which do not contain branching on any carbon atom closer to the 1,2 olefinic double bond than the fourth carbon atom. These comonomers are preferably propylene, 1-butene, 1-hexene, 4-methyl-1-pentene and 1-octene, and most preferably 1-butene. Where the copolymer includes units of more than one alpha-olefin comonomer, the copolymer is sometimes alternatively referred to by a term identifying the total number of ethylene and alpha-olefin monomers employed in the copolymerization. For example, the terms "terpolymer" and "tetramer" may be employed to refer to such copolymers prepared by copolymerizing ethylene with two alpha-olefins and with three alpha-olefins, respectively.

The LLDPE copolymer has a low density of 0.94 g/cc or less (e.g. from about 0.91 or less to 0.94 g/cc). At a given melt index, the density of the copolymer is dependent on the amount and type of the alpha-olefin comonomer copolymerized with the ethylene. Inclusion of increasing amounts of the comonomers results in decreasing copolymer density; while, in general, at a given melt index the molar amount of alpha-olefin comonomer required to achieve a given density decreases with increasing carbon number of the comonomer.

Most (but not all) of the LLDPE copolymers includable as the LLDPE copolymer component in the composition of this invention contain at least 0.5 mol percent (e.g. 0.5 to about 15 mol %) of one or more alpha-olefin comonomer units and not more than 99.5 mol percent (e.g. 99.5 to about 85 mol %) of ethylene units. Many of the includable LLDPE copolymers contain at least 1.0 mol percent (e.g. 1.0 to about 10 mol %) of one or more alpha-olefin comonomer units and not more than 99.0 mol percent (e.g. 99.0 to about 90 mol %) of ethylene units.

Molecules of low density polyethylene (0.91 to 0.94 g/cc) prepared by high pressure processes (typically at least 15,000 psi in commercial production) contain a variety of types of short-chain as well as long-chain branches, the branches or side chains being relatively randomly spaced along the polymer backbone or main chain as illustrated in *Kirk-Othmer, Encyclopedia of Chemical Technology*, 3rd edition, vol. 16 (1981) at page 387 (FIG. 1). In contrast, LLDPE molecules are substantially free of long-chain branching and consist essentially of long sequences of methylene units with relatively uniform-length short side chains spaced relatively periodically along the main chain, thereby having a relatively linear structure as also illustrated in such FIG. 1 of Kirk-Othmer. LLDPE is prepared by various low-pressure processes wherein the copolymerization is conducted under pressures substantially lower than the pressures employed in high-pressure low-density polyethylene processes (e.g. 1200 psi or less, such as 300 psi or less to about 1200 psi, depending on the particular low-pressure process).

The LLDPE copolymer component may have any melt index suitable for a given application. In general, the standard or normal melt index (ASTM D1238 condition E) may be, for example, from slightly more than zero to about 2.0 or more (preferably from about 0.1 to about 1.0) and the high load melt index (ASTM D1238 condition F) may be, for example, from about 1 to about 100.

The LLDPE copolymer component may have any suitable molecular weight distribution, as indicated by the melt flow ratio, for a given application. A suitable melt flow ratio for a variety of applications is from about 22 to about 32 (corresponding to a Mw/Mn ratio from about 2.7 to about 4.1) and preferably from about 25 to about 30 (corresponding) to a Mw/Mn ratio from about 2.8 to about 3.6).

Compatible mixtures of two or more LLDPE copolymers may be employed as the LLDPE copolymer component of the composition of this invention.

While the present invention is applicable to a wide variety of LLDPE copolymers, such copolymers prepared by gas-phase processes (e.g. those described in U.S. Pat. Nos. 4,011,382 (Levine et al.), 4,302,565 (Goeke et al.) and 4,302,566 (Karol et al.) to Union Carbide Corporation) are preferred. An example of an LLDPE copolymer prepared by gas-phase polymerization is the copolymer in Union Carbide ® G-resin 7047 Natural 7, an antioxidant-modified LLDPE resin.

The ring-substituted N-acyl-para-aminophenol, which may be employed alone as the stabilizer component of the composition of this invention, includes an aliphatic acyl group. The number of carbon atoms in the acyl group may be, for example, from about 2 to about 22, preferably from about 12 to about 18 and more preferably from about 14 to about 18.

Examples of aliphatic acyl groups suitable for use herein are caproyl, valeroyl, nonanoyl, lauroyl, myristoyl, palmitoyl, stearoyl, and oleoyl. The acyl group is preferably stearoyl or palmitoyl, and more preferably is stearoyl. Mixtures of such ring-substituted N-acyl-para-aminophenols may be employed as the stabilizer component. Mixtures of such aminophenols containing acyl groups of palmitic acid and stearic acid, respectively, are highly suitable. Compounds suitable for use as the stabilizer and methods for preparing the compounds are well known. The compounds can be prepared, for example, by the method described in published Dutch Patent Application 6505775.

The stabilizer compound contains at least one substituent $R_1$ in the ortho position relative to the hydroxyl group of the phenol moiety, wherein $R_1$ is an acyclic or cyclic alkyl group, which may be, for example, an acyclic alkyl group, which may contain, for example, from 1 to about 8 carbon atoms, or a cycloalkyl group, which may contain, for example, from about 5 to about 12 carbon atoms. $R_1$ is preferably a tertiary alkyl group and more preferably is t-butyl.

Acyclic alkyl groups which can be present as $R_1$ in the aminophenol include, for example, methyl, ethyl, n-propyl, isopropyl, n-butyl, isobutyl, sec-butyl, tertiary (tert- or t-) butyl, pentyl, isopentyl, neopentyl, n-hexyl, sec-hexyl, t-hexyl, n-heptyl, isoheptyl, sec-heptyl, t-heptyl, n-octyl, isooctyl, sec-octyl, and t-octyl. Cycloalkyl groups which can be present as $R_1$ in the aminophenol include, for example, cyclopentyl, cyclohexyl and acyclic alkyl-substituted derivatives thereof, e.g. mono-, di- and tri-methyl cyclohexyl.

The ring-substituted N-acyl-para-aminophenol is preferably further substituted on the benzene ring of the phenol moiety with an independently selected second $R_1$ group, wherein $R_1$ is as defined and described above. The second $R_1$ group, where included, is preferably in the other position ortho to the hydroxyl group of the phenol moiety.

Included among the ring-substituted N-(aliphatic acyl)-para-aminophenols which may be employed as the stabilizer component are, for example:
(a) 2-t-butyl-4-(N-stearoyl)aminophenol,
(b) 2-t-butyl-4-(N-caproyl)aminophenol,
(c) 2-t-butyl-4-(N-valeroyl)aminophenol,
(d) 2-t-butyl-4-(N-nonanoyl)aminophenol,
(e) 2-t-butyl-4-(N-lauroyl)aminophenol,
(f) 2-t-butyl-4-(N-myristoyl)aminophenol,
(g) 2-t-butyl-4-(N-palmitoyl)aminophenol,
(h) 2-t-butyl-4-(N-oleoyl)aminophenol,
(i) the 2,6-di-t-butyl-4-(N-acyl)aminophenol analogs of each of the foregoing 2-t-butyl-compounds (a) to (h), preferably DTB-SPAP,
(j) the 6-alkylated derivatives of each of the foregoing 2-t-butyl compounds (a) to (h) wherein the alkyl group in the 6-position is any $R_1$ group other than t-butyl, where $R_1$ is as defined and described above, e.g. methyl, ethyl, isopentyl, etc.,
(k) the 2-alkylated homologues of each of the foregoing 2-t-butyl compounds (a) to (h) wherein the alkyl group in the 2-position is any $R_1$ group other than t-butyl, where $R_1$ is as defined and described above,
(l) the 2,6-di-alkyl homologues of each of the foregoing 2,6-di-t-butyl compounds (i) wherein the alkyl groups in the 2-position and the 6-position are any $R_1$ group other than t-butyl, where $R_1$ is as defined and described above.

The stabilizer component is preferably DTB-SPAP. Another preferred stabilizer component is a mixture of DTB-SPAP and its palmitoyl homolog, i.e. N-palmitoyl-2,6-di-t-butyl-4-aminophenol, in amounts thereof from about 1 to about 99% and about 99 to about 1%, respectively, and preferably containing approximately equal amounts by weight of these two compounds.

The stabilizer component may be included in any stabilizing amount, i.e. in any amount effective for improving the resistance of the polymeric composition to degradation, such as discoloration and oxidative and thermal degradation. The stabilizer may be included in an amount, for example, per 100 parts by weight of the LLDPE copolymer, of from about 0.005 to about 10 parts by weight, preferably from about 0.005 to about 5 parts by weight and more preferably from about 0.01 to about 1 part by weight.

Compatible fillers and other compatible components may optionally be included in the present composition. A number of fillers which are suitable herein are well known in the art, including for example, clay, talc, silica, titanium dioxide, carbon black, calcium carbonate, and other pigments as well as fibrous fillers such as cellulosic fibers, sawdust, ground cork, and the like. Preferred fillers include clay and calcium carbonate. The amount of filler may be from about 0 to about 250 parts, preferably from about 5 to about 60 parts, per 100 parts of the copolymer.

The stabilizer compounds of this invention may be used alone or in combination with other stabilizers or additive materials, including, for example, sulfide stabilizers such as dilauryl-beta-thiodipropionate and distearyl-beta-thiodipropionate, phosphite stabilizers such as bis-(2,4-di-tert-butyl)pentaerythritol diphosphite and tris(nonylphenyl)phosphite, and the like. In a preferred embodiment, the composition further includes a peroxide-decomposing phosphite, such as any of the above-mentioned phosphite and diphosphite compounds, in an amount effective for decomposing peroxides. In general, such phosphite may be advantageously included in an amount from about 0.005 to about 10 parts, preferably from about 0.01 to about 1 part, per 100 parts of the LLDPE copolymer.

Other antioxidants, antioxonants, thermal stabilizers, ultraviolet light absorbers (e.g. hydroxybenzophenones), coloring materials, dyes, pigments, metal chelating agents, antistatic agents (e.g. N,N-bis(2-hydroxyethyl)alkylamines), slip agents and antiblock agents, such as amides of fatty acids (e.g. bis-erucamides), metal deactivators (e.g. the oxalyl bishydrazides), lubricants (e.g. stearic acid and stearates such as zinc stearate), agents for neutralizing non-neutral catalyst residues (e.g. metal stearates such as calcium or zinc stearate where such residues are acidic) and the like may be included in the composition.

The components of the composition of this invention may be combined by any suitable process. Numerous processes suitable herein are well known in the art, including blending, such as by extrusion, Banbury mixing or by dry-blending.

The stabilized compositions of the present invention may be employed in any of the well-known applications of heretofore known LLDPE compositions. Such applications or end uses include, for example, pipe, electrical wire and cable coatings, blown film, cast film, molded articles prepared by rotational molding (e.g. hollow tanks, hollow spheres and hollow articles of complex shape), injection-molded articles and compression-molded articles.

Practice of the present invention is illustrated by the following non-limiting examples. All parts, percents and other amounts given through this disclosure, including the examples which follow, are by weight unless otherwise indicated.

Unless otherwise indicated,, the LLDPE copolymer employed in the following examples was the precursor to Union Carbide® G-Resin 7047 Natural 7 antioxidant-modified linear low-density polyethylene resin, i.e. such resin prior to incorporating an antioxidant. This copolymer typically has a density of about 0.92, a melt index of about 1.0 (ASTM D1238 condition E) and a 1-butene comonomer content of about 3–5 mol percent.

EXAMPLE 1

The following general procedure was followed using each of the compounds indicated below as the separately tested "compound" in such procedure. The compound (1 part) in finely divided form was dry blended with the LLDPE comonomer (1000 parts), which also was in finely divided form. The resulting blend composition was extruded to form a rod using a single-screw ¾" Brabender extruder (Model No. 252, L:D ratio of 25:1). The extruder was operated with its three heating zones and die (3.5 mm orifice) at a temperature setting of 210° C. and with a screw-speed setting of 50 rpm. The extruded rod was water quenched, dried and chopper-pelletized into pellets approximately 2 mm in length. Following the foregoing compounding or finishing portion of the procedure, melt processing was performed as follows: the composition was melt extruded repeatedly (five times) using the foregoing extrusion conditions except that the temperature setting was 260° C., with each resulting rod being water quenched, dried and pelletized (using the foregoing quench dryplletize sequence) after each melt extrusion step. The melt index of a separate sample of each of the pelletized compositions resulting from the first, third and fifth extrusions at 260° C. was determined according to ASTM D1238 condition E (190° C., 2160 g). A separate sample from each of these three extrusions was compression molded at 150° C. and 250 psi into film 30 mils in thickness. Each film was placed in a Hunter Lab D-54 Spectrophotometer and its Yellowness Index was measured according to ASTM D1925.

The results of the measurements of melt index and Yellowness Index are set forth in Tables I and II, respectively. Such tables also show the results for a "control", i.e. a composition consisting of 1000 parts of the LLDPE which was processed using the above melt processing procedure with no added compound.

TABLE I

| Melt Index - Repeated Extrusions at 260° C. | | | |
| --- | --- | --- | --- |
| | Melt Index (g/10 min.) | | |
| After Extrusion No. | 1 | 3 | 5 |
| Compound | | | |
| None (Control) | 0.61 | 0.38 | 0.29 |
| DTB-SPAP[a] (Invention) | 1.02 | 1.02 | 0.98 |
| Comparative A[b] | 0.97 | 0.90 | 0.85 |
| Comparative B[c] | 0.99 | 0.89 | 0.80 |

[a]N—stearoyl-2,6-di-tert-butyl-4-aminophenol
[b]pentaerythrityl tetrakis[3-(3,5-di-tert-butyl-4-hydroxyphenyl)propionate] - supplied as Irganox ® 1010 (Ciba-Geigy Corporation, Ardsley, New York)
[c]octadecyl 3-(3,5-di-tert-butyl-4-hydroxyphenyl)propionate - supplied as Irganox ® 1076 (Ciba-Geigy Corporation)

TABLE II

| | Yellowness Index | | |
| --- | --- | --- | --- |
| After Extrusion No. | 1 | 3 | 5 |
| Compound | | | |

TABLE II-continued

| | Yellowness Index | | |
| --- | --- | --- | --- |
| After Extrusion No. | 1 | 3 | 5 |
| None (Control) | 3.61 | 7.88 | 11.03 |
| DTB-SPAP[a] (Invention) | 7.76 | 14.00 | 18.71 |
| Comparative A[b] | 12.12 | 19.39 | 23.67 |
| Comparative B[c] | 11.09 | 16.28 | 20.71 |

[a], [b] and [c] - See Table I for identification

The results show better resistance to changes in melt index (Table I) and better resistance to discoloration (Table II) during melt processing for the LLDPE composition containing DTB-SPAP.

EXAMPLE 2

The procedure of Example 1 was repeated in all pertinent respects except that 1 part zinc stearate and 1 part bis(2,4-di-tert-butyl)pentaerythritol diphosphite (supplied as Weston TM MDW-626, Borg-Warner Chemicals, Inc.) were incorporated into the LLDPE copolymer, along with the "compound", in the compounding or finishing portion of the procedure.

The melt index was measured according to ASTM D1238 condition E (190° C., 2160 g) on a sample of each of the pelletized compositions following each of the first, third and fifth extrusions at 260° C. The results are set forth in Table III.

TABLE III

| Melt Index - Repeated Extrusions at 260° C. | | | |
| --- | --- | --- | --- |
| | Melt Index (g/10 min.) | | |
| After Extrusion No. | 1 | 3 | 5 |
| Compound | | | |
| DTB-SPAP[a] | 1.01 | 1.01 | 1.01 |
| Comparative A[b] | 1.01 | 1.01 | 0.93 |
| Comparative B[c] | 1.03 | 1.02 | 0.99 |

[a], [b] and [c] - See Table I for identification

The results show better resistance to changes in melt index for the LLDPE composition containing the DTB-SPAP.

BEST MODE CONTEMPLATED

The best mode contemplated for carrying out this invention has been set forth in the above description, for example, by way of setting forth preferred materials and operating conditions, including but not limited to preferred ranges and values of amounts and other nonobvious variables material to successfully practicing the invention in the best way contemplated at the time of executing this patent application.

It is understood that the foregoing detailed description is given merely by way of illustration and that many modifications may be made therein without departing from the spirit or scope of the present invention.

What is claimed is:

1. A stabilized ethylene/alpha-olefin copolymer-containing composition comprising:
   (A) linear low-density polyethylene (LLDPE) as said copolymer; and
   (B) a stabilizing amount of from about 0.01 to about 0.1 parts per 100 parts of said copolymer of a stabilizer, said stabilizer being a ring substituted N-(aliphatic acyl)para-aminophenol containing at least one substituent $R_1$ in the ortho position relative to the hydroxyl group of the phenol moiety, wherein the aliphatic acyl group contains from about 2 to about 22 carbon atoms and $R_1$ is an alkyl group selected from acyclic alkyl groups containing from 1 to about 8 carbon atoms and cycloalkyl groups containing from 5 to about 12 carbon atoms.

2. The composition of claim 1 wherein $R_1$ is a tertiary alkyl group.

3. The composition of claim 2 wherein $R_1$ is t-butyl.

4. The composition of claim 1 wherein the benzene ring of the aminophenol is further substituted with an independently selected second $R_1$ group, wherein $R_1$ is as defined above.

5. The composition of claim 4 wherein said second $R_1$ group is in the other position ortho to the hydroxyl group.

6. The composition of claim 5 wherein said second $R_1$ group is t-butyl.

7. The composition of claim 6 wherein said aminophenol is N-stearoyl-2,6-di-t-butyl-4-aminophenol.

8. The composition of claim 1 wherein the acyl group contains from about 14 to about 18 carbon atoms.

9. The composition of claim 8 wherein said acyl group is stearoyl.

10. The composition of claim 8 wherein said acyl group is palmitoyl.

11. The composition of claim 1 wherein said stabilizer is a mixture of N-stearoyl-2,6-di-t-butyl-4-aminophenol and N-palmitoyl-2,6-di-t-butyl-4-aminophenol.

12. The composition of claim 1 which further comprises a peroxide-decomposing phosphite compound in a peroxide-decomposing amount.

13. The composition of claim 12 wherein said phosphite compound is bis(2,4-di-tert-butyl)pentaerythritol diphosphite.

14. The composition of claim 13 wherein said stabilizer compound comprises N-stearoyl-2,6-di-t-butyl-4-aminophenol.

15. The composition of claim 1 wherein the LLDPE alpha olefin comonomer is selected from the group consisting of propylene, 1-butene, 1-pentene, 1-hexene, 1-pentene, 1-octene, 4-methyl-1-pentene and mixtures thereof.

16. The composition of claim 1 wherein the LLDPE alpha olefin comonomer is 1-butene.

17. The composition of claim 1 wherein units of the LLDPE alpha olefin comonomer constitute from about 1 to about 10 mol percent of the LLDPE copolymer.

* * * * *